United States Patent [19]

Häberle

[11] Patent Number: 5,499,802
[45] Date of Patent: Mar. 19, 1996

[54] WORKPIECE-HOLDING SYSTEM

[75] Inventor: Rainer Häberle, Laichingen, Germany

[73] Assignee: Gerhard Haberle, Laichingen, Germany

[21] Appl. No.: 198,451

[22] Filed: Feb. 18, 1994

[30] Foreign Application Priority Data

Feb. 20, 1993 [DE] Germany ............ 43 05 260.6

[51] Int. Cl.⁶ ..................................... B25B 1/08
[52] U.S. Cl. ............ 264/99; 269/235; 269/305
[58] Field of Search ............ 269/99, 100, 303, 269/315, 231, 235, 196, 900

[56] References Cited

U.S. PATENT DOCUMENTS

| | | | |
|---|---|---|---|
| 1,102,814 | 7/1914 | Streit | 269/235 |
| 2,372,716 | 4/1945 | Evans . | |
| 2,430,613 | 11/1947 | Hodge | 269/231 |
| 3,122,048 | 2/1944 | Warner . | |
| 3,608,886 | 9/1971 | Greene | 269/305 |
| 3,827,685 | 8/1974 | Wennes | 269/231 |
| 4,186,916 | 2/1980 | Varga | 269/303 |
| 4,805,888 | 2/1989 | Bishop | 269/99 |
| 4,915,367 | 4/1990 | Carossino | 269/235 |
| 5,094,436 | 3/1992 | Stephan . | |

FOREIGN PATENT DOCUMENTS

| | | |
|---|---|---|
| 0236537 | 9/1987 | European Pat. Off. . |
| 0275923 | 7/1988 | European Pat. Off. . |
| 0308333 | 3/1989 | European Pat. Off. . |
| 2112262 | 6/1972 | France . |
| 8715602 | 4/1938 | Germany . |
| 1923833 | 11/1970 | Germany . |
| 9016871 | 4/1991 | Germany . |
| 9202180 | 6/1992 | Germany . |
| 908566 | 2/1982 | U.S.S.R. . |

*Primary Examiner*—Robert C. Watson
*Attorney, Agent, or Firm*—Herbert Dubno; Andrew Wilford

[57] ABSTRACT

A system for holding a workpiece has a support table having a support surface and formed with an array of anchor seats opening at the support surface. At least one clamp securable in a one of the seats has a clamp body displaceable parallel to the support surface. A stop body normally lying on the surface has a centering formation defining an axis generally perpendicular to the support surface and has a polygonal periphery defined by a plurality of flat sides generally perpendicular to the surface and lying at different spacings from the axis. An anchor centered on the axis and seated in a one of the seats secures the stop body to the surface with one of its sides bearing against the workpiece and the stop-body axis fixed relative to the respective seat.

18 Claims, 9 Drawing Sheets

Fig. 15

WORKPIECE-HOLDING SYSTEM

FIELD OF THE INVENTION

The present invention relates to a workpiece-holding system. More particularly this invention concerns such a system used to hold a workpiece on a table while the workpiece is machined or otherwise worked on.

BACKGROUND OF THE INVENTION

In order to secure a workpiece on a table so that it can be machined or otherwise worked on, it is standard to form the table with an array of slots formed as inverted T's as seen in section. The workpiece is laid on the surface and one or more stops are fitted to the slot on one side of the workpiece and one or more clamps to the slot on the other side of the workpiece.

Each stop typically comprises a so-called T-nut which fits in and can be slid along the respective T-slot. A stop block sitting atop the table is secured by a bolt passing through it and extending into a threaded bore of the respective T-nut. Thus the stops can be slid along the table and bolted in any position along the slot.

Each clamp normally has a T-nut like the stops and a clamp body formed with a hole through which the shank of a clamp bolt passes with some play. The bolt has an eccentric head that fits in a complementary seat on the clamp block so that as the screw is rotated the clamp block will move radially of the bolt axis. Thus the clamp bolt can be rotated to brace the clamp block tightly against its side of the workpiece.

To provide some degree of adjustability, the stop blocks can be formed with slots instead of a simple cylindrical hole, allowing them to be bolted down in different positions. This system has the disadvantage that the stop can, in conditions of extreme stress, shift and thereby let the workpiece move. In another system so-called step blocks are used. These items are two-part stop blocks with stepped interfitting surfaces so that they can be shifted relative to each other to, in effect, make a stop block of different widths. Such an arrangement is fairly clumsy and has extra parts that are easily lost.

OBJECTS OF THE INVENTION

It is therefore an object of the present invention to provide an improved workpiece-clamping system.

Another object is the provision of such an improved workpiece-clamping system which overcomes the above-given disadvantages, that is which is easy to use but which provides a full range of adjustability for clamping workpieces of virtually any size.

SUMMARY OF THE INVENTION

A system for holding a workpiece has according to the invention a support table having a support surface and formed with an array of anchor seats opening at the support surface. At least one clamp securable in a one of the seats has a clamp body displaceable parallel to the support surface. A stop body normally lying on the surface has a centering formation defining an axis generally perpendicular to the support surface and has a polygonal periphery defined by a plurality of flat sides generally perpendicular to the surface and lying at different spacings from the axis. An anchor centered on the axis and seated in a one of the seats secures the stop body to the surface with one of its sides bearing against the workpiece and the stop-body axis fixed relative to the respective seat.

Thus with this system the stop body can be turned about its axis to bring different sides to bear on the workpiece and, thereby, change the effective size of the stop body between its axis and the workpiece-engaging side. Once the desired orientation is obtained, the anchor can be tightened to lock the stop body in place.

According to the invention the centering formation can be unitarily formed with the stop body. The anchor is a bolt extending through the stop body and into the respective seat. It is also possible for the centering formation to be formed by the bolt. Normally the centering formation is a collar projecting from a face of the stop body and engaged in the respective seat.

In a particularly easy-to-use embodiment the table is formed with a plurality of parallel T-slots forming the seats. T-nuts in the slots serve as anchors for the bolts of the stop bodies. The centering formation can be a collar surrounding the bolt and engaged in the respective T-slot. Normally the T-slot has a wide base region and a narrow neck region and the T-nut similarly has a respective wide base part and a narrow neck part. The T-nut is formed with a threaded bore in which the bolt is seated. The centering formation is a collar surrounding the bolt and engaged in the neck region of the respective T-slot. The neck part of the T-nut and the collar have a combined axial length that is shorter than an axial depth of the neck region of the T-slot. The centering formation can also be a spacer sleeve surrounding the bolt, or a collar projecting from a face of the stop body, engaged in the respective seat, and engaged coaxially in the spacer sleeve.

The centering formation in accordance with this invention is generally cylindrical and has an outside diameter equal generally to a transverse width of the neck region. This centering formation can also be polygonal in cross section with opposite sides parallel and have a pair of opposite sides spaced apart by a distance equal to the transverse width of the neck region. The centering formation is square in cross section, or can be rectangular to fit in either of two positions in T-slots of different widths. When the sides of the centering formation meet at rounded corners the formation can be twisted to fit tightly in a T-slot of virtually any dimensions.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

As seen in FIGS. 1 through 3 and 12 a workpiece 14 is held on a table 10 between a plurality of clamps 16 and a plurality of stops 18. The table 10 is formed with an array of equispaced and parallel T-slots 12 opening at its planar upper face 38 and each comprising a narrow neck portion 40 and a wider base portion 41, with a pair of shoulder surfaces 52 extending parallel to the face 38 and separating the portions 40 and 41 from each other. These T-slots 12 are standard and can be of different widths.

Figure 1:
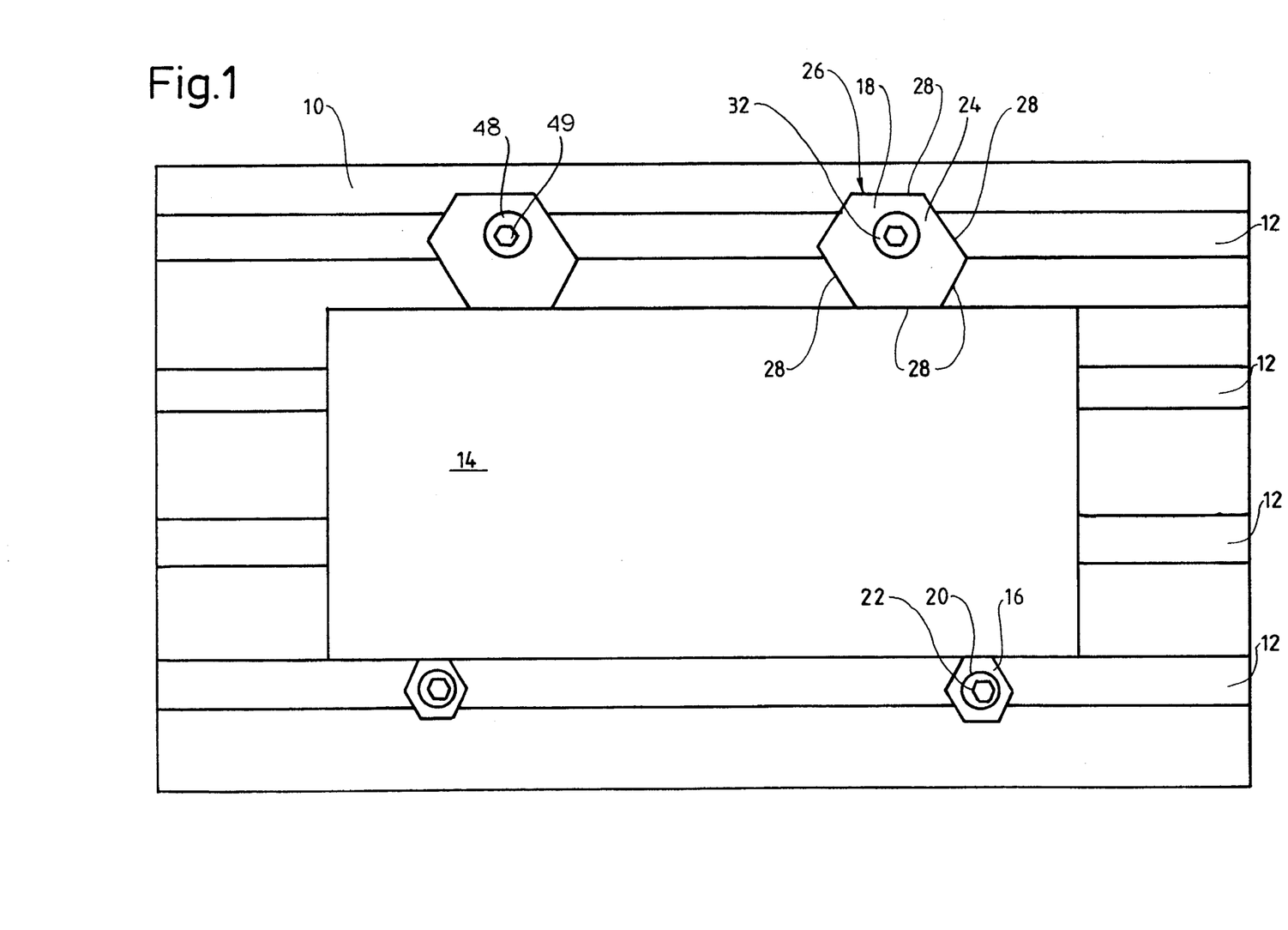
FIG. 1 is a top view of a workpiece-clamping system according to the invention.
Figure 2:
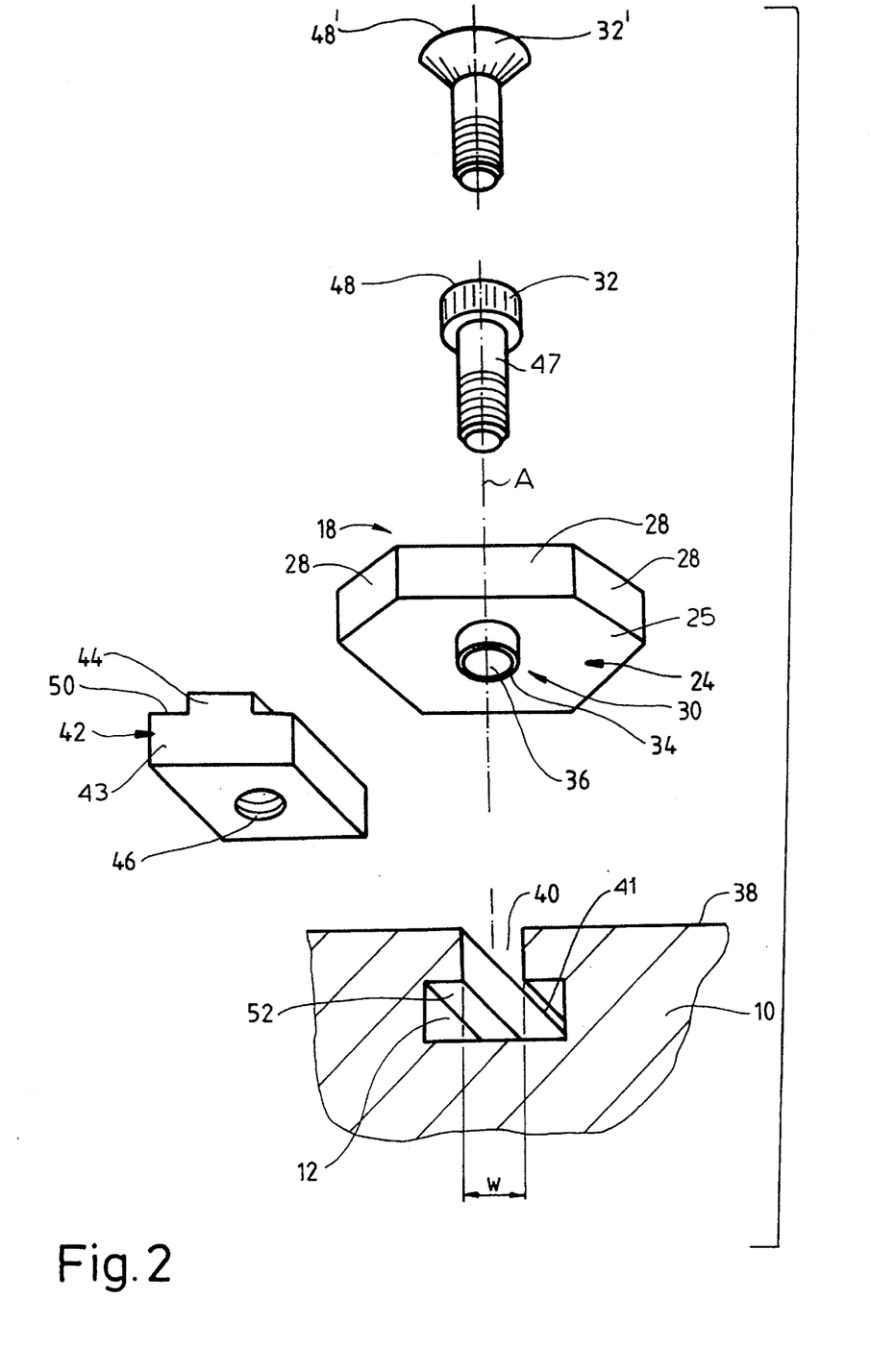
FIG. 2 is a sectional and exploded view of a detail of the system of FIG. 1.
Figure 3:
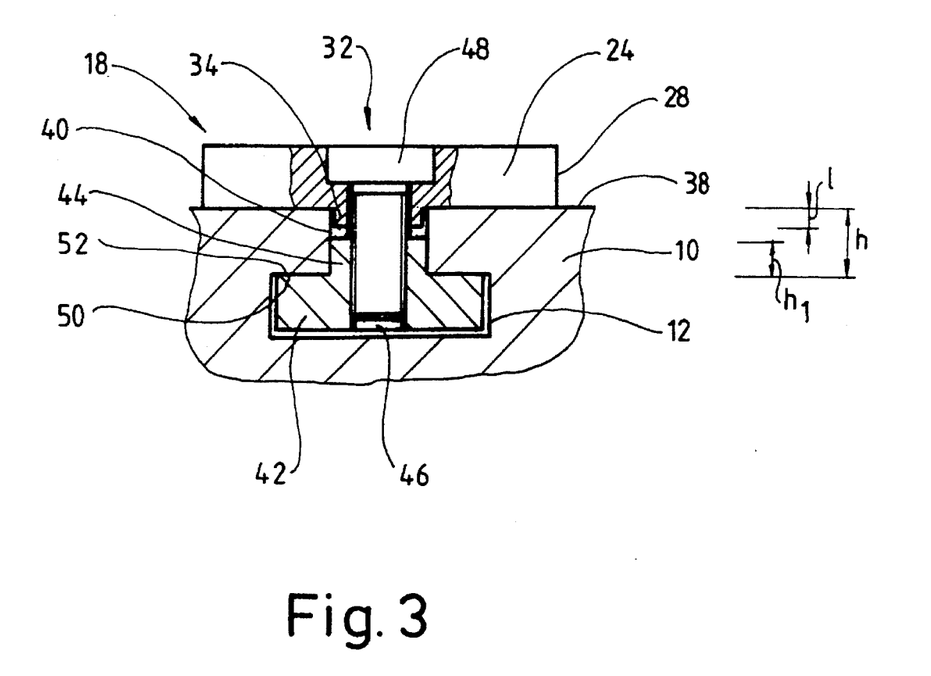
FIG. 3 is an axial section through the detail of FIG. 2 in assembled condition.

Each clamp 18 according to the invention is formed of three parts: a clamp block 24, a T-nut or slide 42, and a bolt 32. The block 24 has a polygonal periphery 26 formed by a plurality of flat sides 28 and a central hole 36 extending along an axis A. The sides 28 are all differently spaced from the axis A, typically in increments of 2 mm, that is with one side surface 28 2 mm closer to the axis A than the surface 28 on one side and 2 mm further than the surface on its other side. In addition the block 24 has a centering formation 30 in the form of a cylindrically tubular collar 34 unitarily formed with and internally defining the lower portion of the bore 36.

The T-nut 42 has an upper narrow neck portion or ridge 44 and a lower wider portion or base 43 separated by shoulder surfaces 50. The portions 44 and 43 are dimensioned to fit complementary into the respective portions 40 and 41 of the slots 12. The T-nut 42 is centrally formed with a threaded bore 46 opening upward in the center of its neck portion 44.

The bolt 32 has a cap head 48 with a hexagonal allan recess 49 and a threaded shank 47 adapted to fit into the threaded bore 46. As shown in the top of FIG. 2 a bolt 32' having a frustoconical head 48' may also be used. In either case the upper end of the bore 36 is complementary to the shape of the screw head 48 or 48'. In use the formation 30 fits in the neck 40 of the groove 12 and the screw 32 pulls the faces 40 of the block 42 up against the surfaces 52 while pressing a lower face 25 of the block 24 down onto the upper surface 38 of the table 10.

Figure 12:
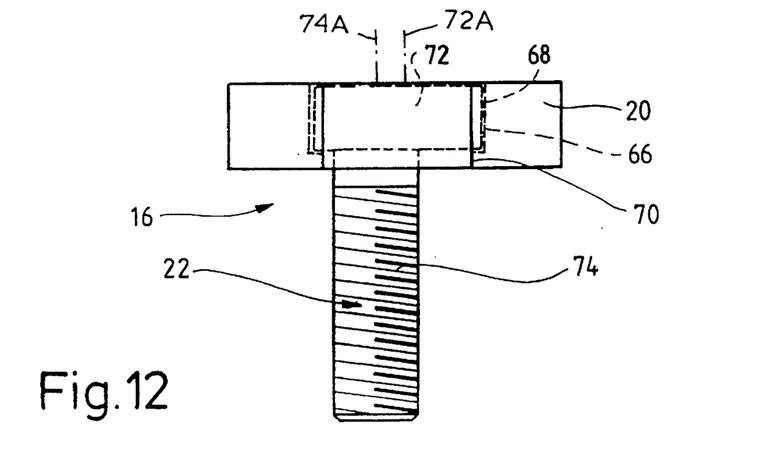
FIG. 12 is a side view of a part of the clamping arrangement of the instant invention.

As seen in FIG. 12 the clamp 16 comprises an outer part 20 and a bolt or screw 22, the latter intended to fit into a T-nut identical to the nut 42 of FIG. 2. The part 20 has a stepped bore 66 with a large-diameter upper part 68 and a small-diameter lower part 70 respectively shaped to accommodate a head 27 and a shank 74 of the bolt 22. The bore 66 is centered in the hexagonal upper part 20, but the head 72 is centered on an axis 72A offset by about 0.75 mm from an axis 74A of the shaft 74. Thus as the bolt 72 is rotated the axis 72A will orbit about the axis 74A through a stroke of about 1.5 mm. Even with a stroke of 1 mm, in combination with the 2 mm stepping of the surfaces 28 as described above, it is possible to clamp a workpiece 14 of any size.

FIG. 3 illustrates how the space between the surfaces 38 and 52 has a height h, the collar 34 has an axial length l, and the ridge part 44 of the nut 42 has an axial height $h_1$. The sum of the dimensions l and $h_1$ is equal to less than the height h so that the nut 42 and block 18 never contact each other. The diameter of the collar 34 is generally equal to or is equal to slightly less than the transverse width w (FIG. 2) of the slot 40 for accurate centering of the block 18 in the slot 12.

Such an arrangement is used by setting at least two of the clamps 16 in a slot 12 loosely and then pressing one edge of the workpiece 14 against them, until the shaft axis 74A of each clamp 16 is between the workpiece 14 and the respective head axis 72A. Then at least two of the stops 18 are set in one of the grooves 12 on the other side of the workpiece 14 and the blocks 24 are rotated until one face 28 can be closely juxtaposed with the respective workpiece edge. Then the bolts 32 are tightened, and then the bolts 22. As the bolts 22 are rotated in their nuts 42 the respective parts 20 move radially of the axis 74A until the wedge tightly against the workpiece 14. This leaves the workpiece 14 solidly held on the surface 38 between the clamps 16 and stops 18.

Figure 4:
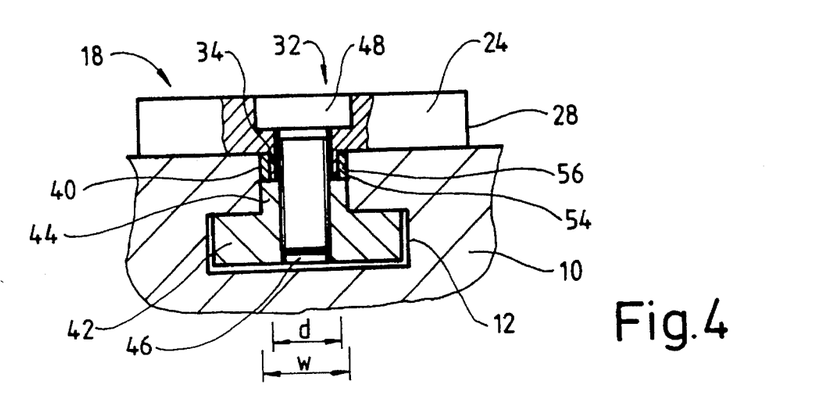
FIG. 4 is a view like FIG. 3 of another stop arrangement according to the invention.
Figure 5:
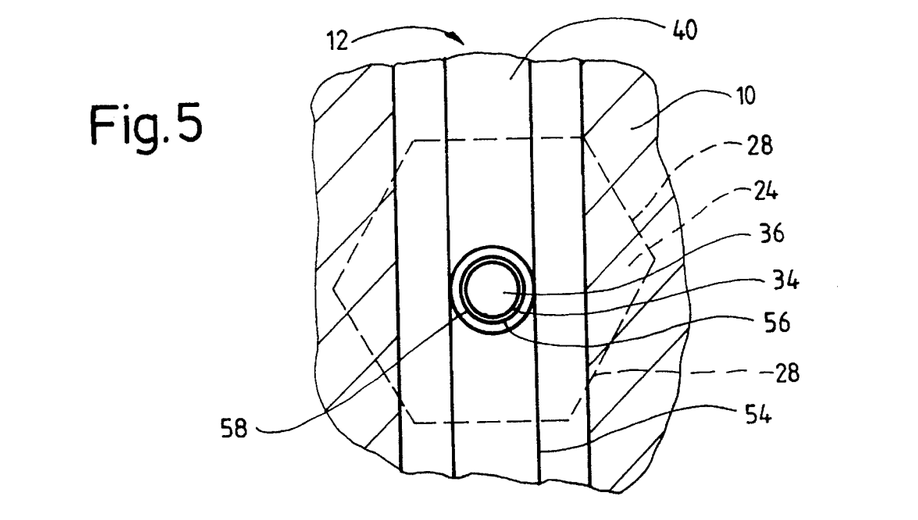
FIGS. 5, 6, 7, 8, 9, 10, and 11 are top views of details of variants on the stop arrangement.

FIGS. 4 and 5 show an arrangement where a collar 34' is of a diameter d slightly smaller than the width w between side surfaces 54 of the neck part 40 of the groove 12. The nut 42 is provided with an upstanding cylindrically tubular sleeve 56 having an outside diameter equal to the width w or slightly less and a central bore of a diameter equal to diameter d or slightly more. Thus this spacer sleeve 56 ensures that the collar 34 is received substantially without play in the upper part 40 of the groove 12. This makes it possible to use blocks 24 with grooves 12 of different widths, substituting them for prior-art unadjustable blocks.

Figure 6:
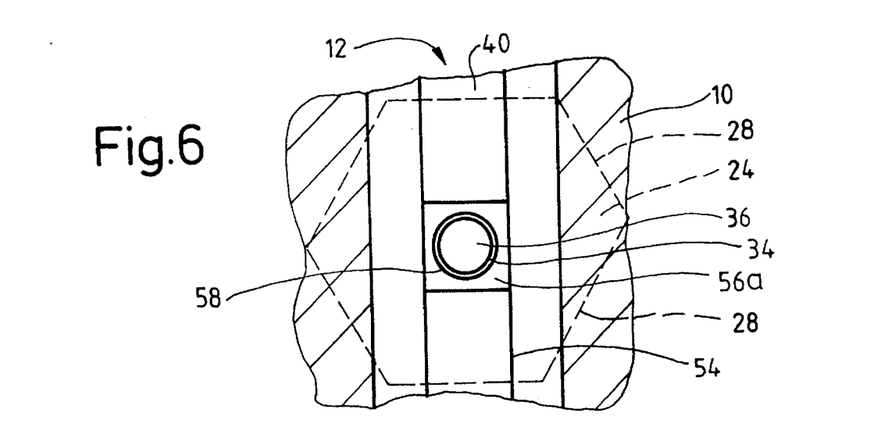
Figure 7:
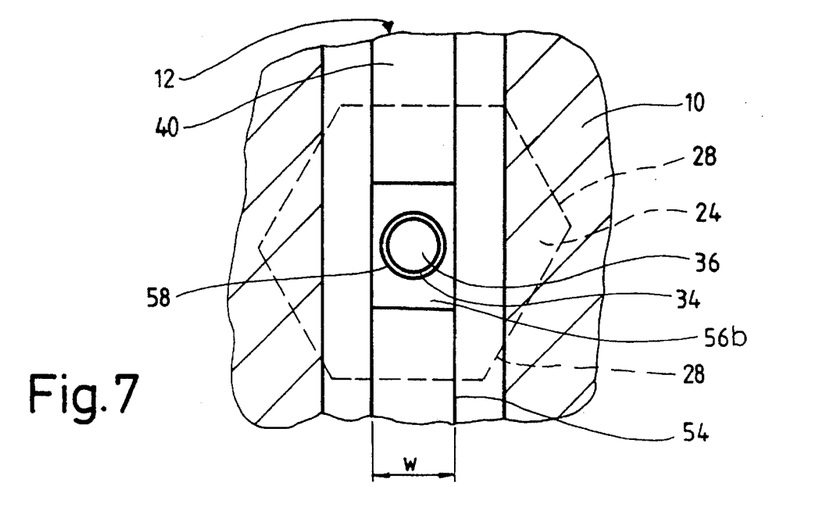
Figure 8:
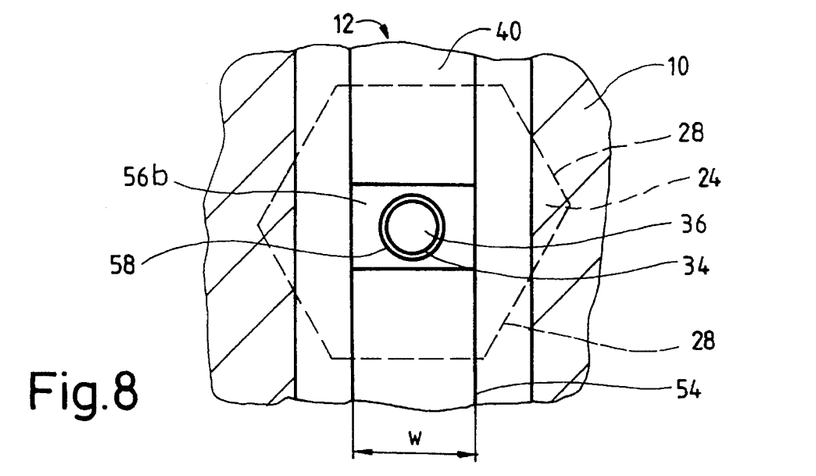
Figure 9:
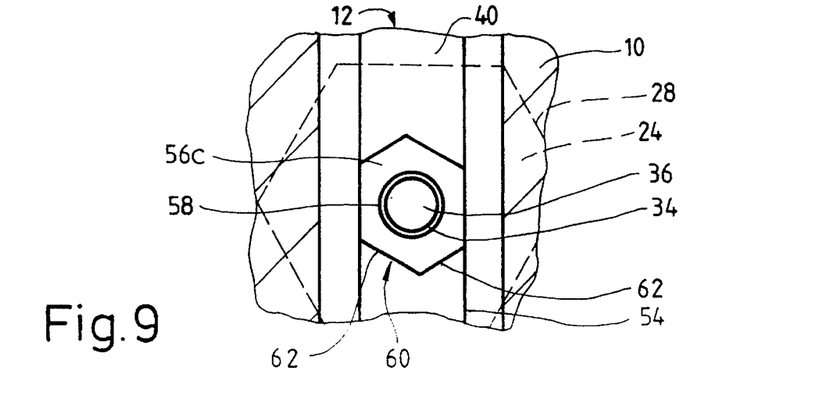
Figure 10:
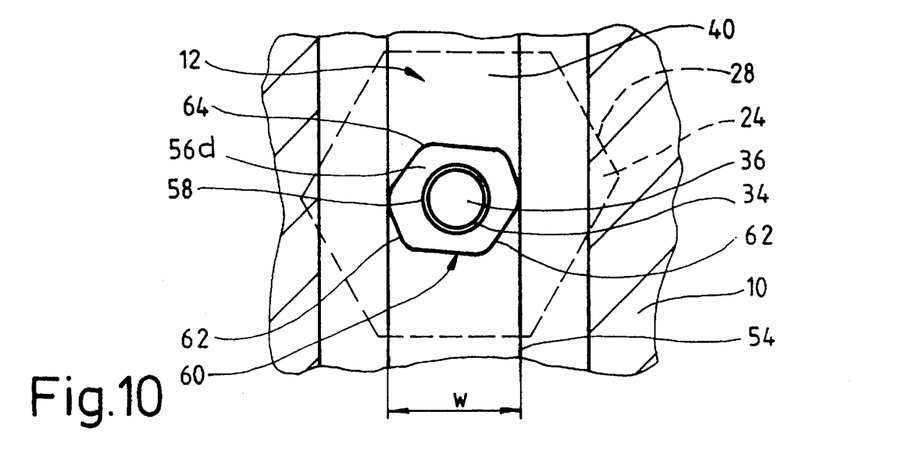
Figure 11:
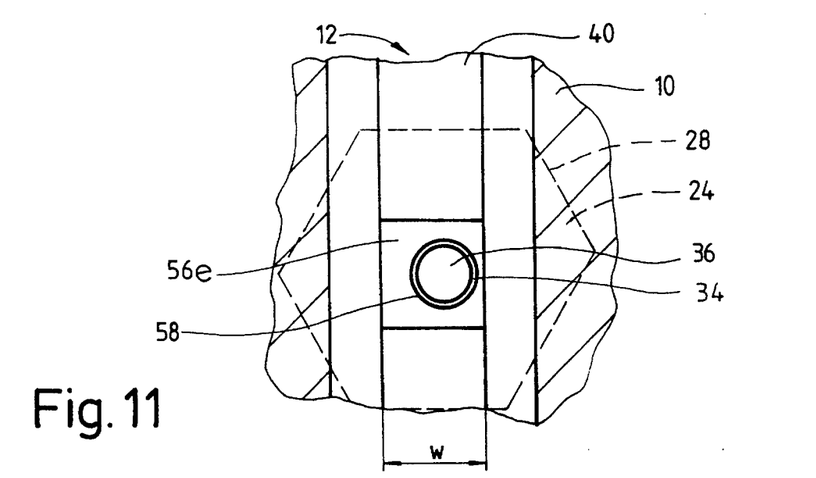

In FIG. 6 a spacer sleeve 56a is used whose outer shape is parallepipedal so that it slides flatly on the surfaces 54. The arrangement of FIG. 7 has a rectangular-shaped body whose longitudinal dimension is longer than its transverse dimension so that it can be turned to fit wide grooves 12 as shown in FIG. 8. In FIG. 9 a spacer 56c is shown whose periphery 60 has the shape of an irregular hexagon whose opposite faces 62 are parallel to each other so that it can fit in three different positions in grooves of three different widths. FIG. 10 shows a hexagonal-shaped spacer 56d having rounded corners 64 so that it can be rotated and wedged in the groove 12 as illustrated. In FIG. 11 a spacer 56e is square, as in FIG. 6, but has its bore 58 off-center and differently spaced from each face of the spacer, that is not midway in either direction, so that four different positions for the axis 74A are possible depending on how the spacer is inserted in the groove 12. In all these arrangements the outside diameter of the collar 34 is substantially less than the width w of the groove 40.

Figure 13:
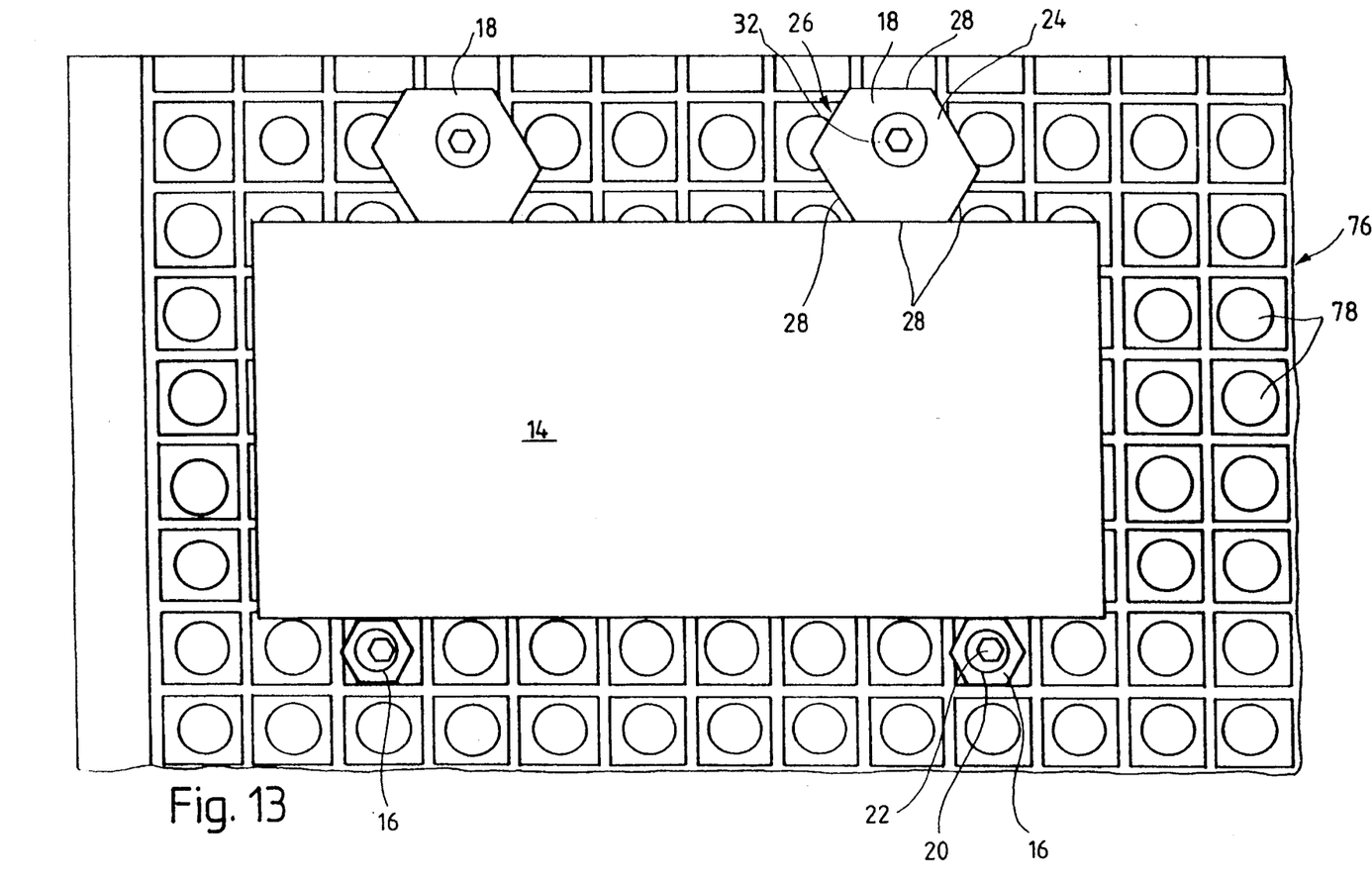
FIG. 13 is a view like FIG. 1 of another clamping system in accordance with this invention.
Figure 14:
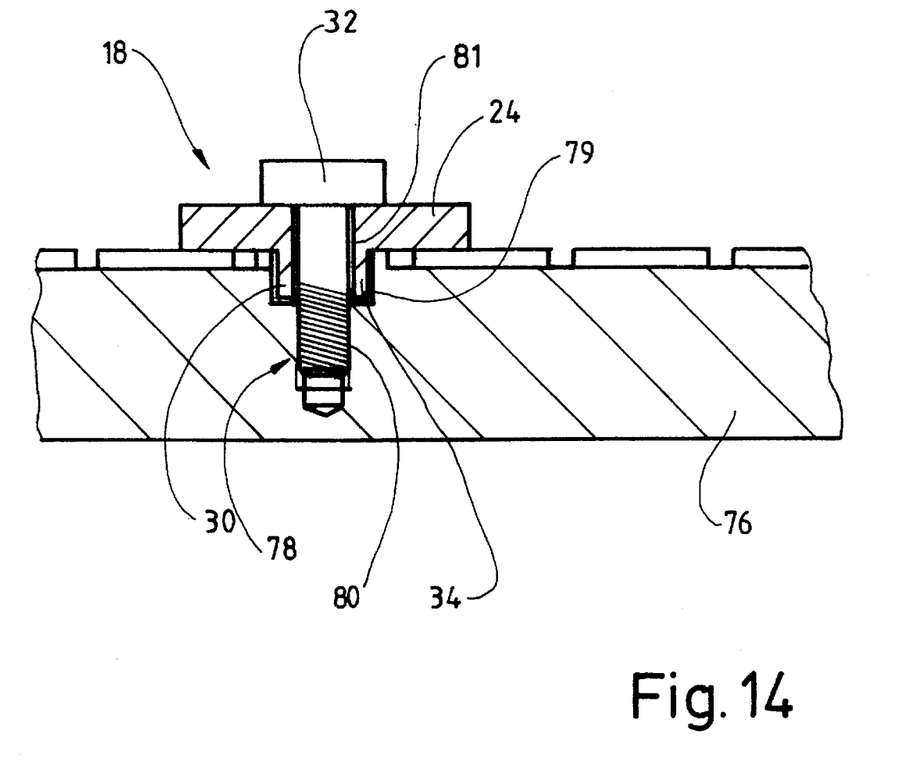
FIG. 14 is an axial section through a detail of FIG. 13.

In FIG. 13 a table plate 76 is formed with a uniform array of hole formations 78 distributed in a raster and each threaded to receive the bolts 22 or 32. As better seen in FIG. 14 each hole 78 is stepped, having a large-diameter upper portion 79 shaped to complementary receive a collar 34 and a threaded lower portion shaped to receive the threaded shank of the screw 22 or 32.

Figure 15:
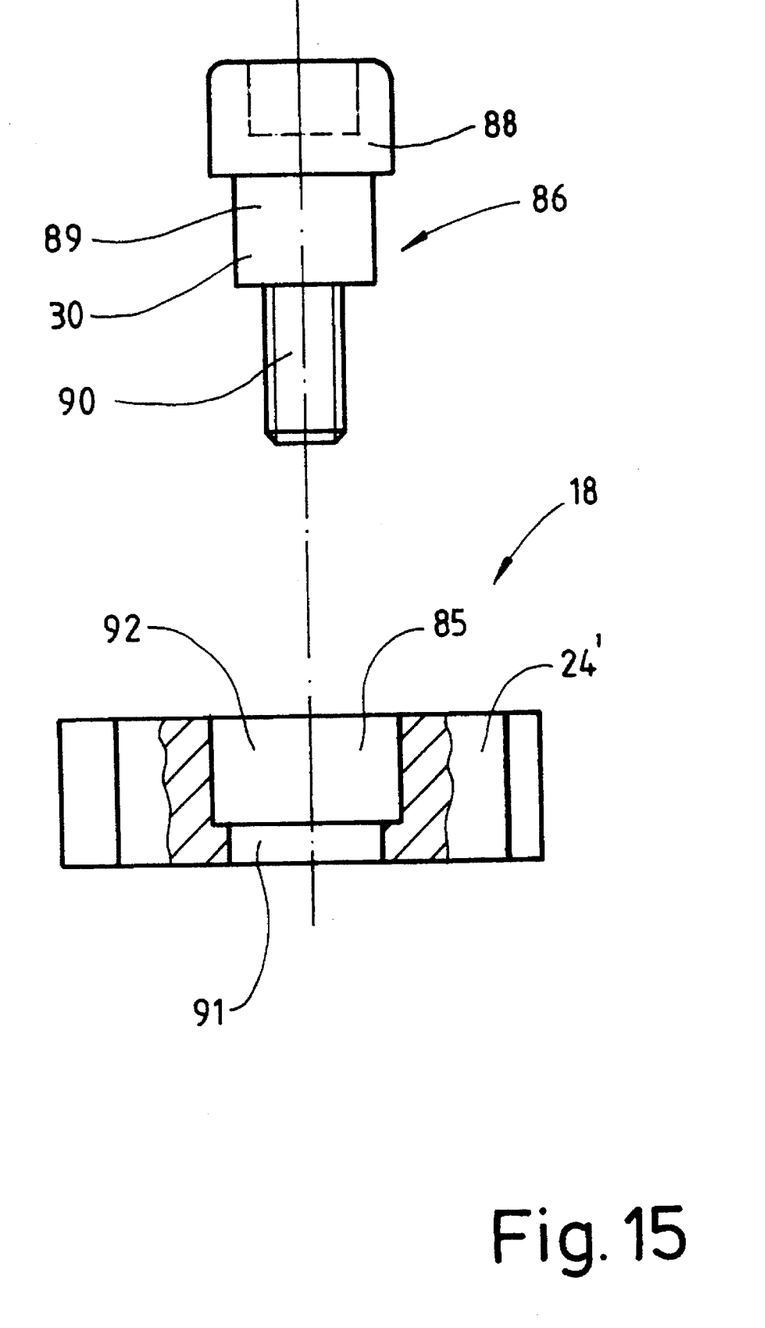
FIG. 15 is a side exploded view of a detail of the system of FIG. 13.

FIG. 15 shows how a block 24' can have no centering collar 34. Instead, a screw 86 has a small-diameter shank and a medium-diameter middle region 89 forming the guide 30 and replacing the collar 34. The screw 86 has a head 88 that fits in a large-diameter upper region 92 of a stepped bore 85 while its cylindrical middle region 89 extends down through a small-diameter lower portion 91 of the bore 85 to act as a guide 30. Thus, like the systems described above, the system of FIG. 15 can be used with an existing T-nut.

I claim:

1. A system for holding a workpiece, the system comprising:
   a support table having a support surface and formed with an array of anchor seats opening at the support surface;
   at least one clamp securable in a one of the seats and having a clamp body displaceable parallel to the support surface;

a stop body normally lying on the surface, having a centering formation formed as a collar projecting from a face of the stop body, engaged in the respective seat, defining an axis generally perpendicular to the support surface, and having a polygonal periphery defined by a plurality of flat sides generally perpendicular to the surface and lying at different spacings from the axis; and means including an anchor bolt centered on the axis, extending through the stop body, and seated in a one of the seats for securing the stop body to the surface with one of its sides bearing against the workpiece and the stop-body axis fixed relative to the respective seat.

2. The workpiece-holding system defined in claim 1 wherein the centering formation is unitarily formed with the stop body.

3. The workpiece-holding system defined in claim 1 wherein the centering formation is formed by the bolt.

4. The workpiece-holding system defined in claim 1 wherein the table is formed with a plurality of parallel T-slots forming the seats, the system further comprising a T-nut in one of the slots, the bolt being threaded into the T-nut.

5. The workpiece-holding system defined in claim 6 wherein the centering formation is a collar surrounding the bolt and engaged in the respective T-slot.

6. The workpiece-holding system defined in claim 4 wherein the T-slot has a wide base region and a narrow neck region and the T-nut similarly has a respective wide base part and a narrow neck part, the T-nut being formed with a threaded bore in which the bolt is seated.

7. The workpiece-holding system defined in claim 6 wherein the centering formation is a collar surrounding the bolt and engaged in the neck region of the respective T-slot, the neck part of the T-nut and the collar having a combined axial length that is shorter than an axial depth of the neck region of the T-slot.

8. The workpiece-holding system defined in claim 1 wherein the centering formation includes a spacer sleeve surrounding the bolt.

9. The workpiece-holding system defined in claim 8 wherein the centering formation is engaged coaxially in the spacer sleeve.

10. The workpiece-holding system defined in claim 9 wherein the table is formed with an array of T-slots constituting the seats and each having a relatively narrow neck region opening at the surface and of a width generally equal to an outside diameter of the spacer sleeve and a T-nut in the respective seat into which the bolt is threaded.

11. The workpiece-holding system defined in claim 1 wherein the table is formed with an array of T-slots constituting the seats and each having a relatively narrow neck region opening at the surface and of a predetermined transverse width and a T-nut in the respective seat into which the bolt is threaded.

12. A system for holding a workpiece, the system comprising:

a support table having a support surface and formed with a plurality of T-slots each having a relatively narrow neck region opening at the surface and of a predetermined transverse width;

a T-nut in one of the slots;

at least one clamp securable in a one of the slots and having a clamp body displaceable parallel to the support surface;

a stop body normally lying on the surface, having a centering formation defining an axis generally perpendicular to the support surface, and having a polygonal periphery defined by a plurality of flat sides generally perpendicular to the surface and lying at different spacings from the axis, the centering formation being generally cylindrical and having an outside diameter equal generally to a transverse width of the neck region; and means including an anchor bolt centered on the axis and threaded into the T-nut for securing the stop body to the surface with one of its sides bearing against the workpiece and the stop-body axis fixed relative to the respective slot.

13. The workpiece-holding system defined in claim 11 wherein the centering formation is polygonal in cross section with opposite sides parallel and has a pair of opposite sides spaced apart by a distance equal to the transverse width of the neck region.

14. The workpiece-holding system defined in claim 13 wherein the centering formation is rectangular in cross section.

15. The workpiece-holding system defined in claim 14 wherein the centering formation is square in cross section.

16. The workpiece-holding system defined in claim 13 wherein the sides of the centering formation meet at rounded corners.

17. The workpiece-holding system defined in claim 1 wherein the formations are threaded holes.

18. A system for holding a workpiece, the system comprising:

a support table having a support surface and formed with a plurality of parallel T-slots opening at the support surface and each having a wide base region and a narrow neck region;

a T-nut in one of the slots, formed with a threaded bore, and having a wide base part and a narrow neck part at least one clamp securable in a one of the slots and having a clamp body displaceable parallel to the support surface;

a stop body
normally lying on the surface,
having a centering collar surrounding the bolt, engaged in the neck region of the respective T-slot, and defining an axis generally perpendicular to the support surface, and
having a polygonal periphery defined by a plurality of flat sides generally perpendicular to the surface and lying at different spacings from the axis, the neck part of the T-nut and the collar having a combined axial length that is shorter than an axial depth of the neck region of the T-slot; and means including an anchor bolt centered on the axis, extending through the stop body, and threaded into the bore of the T-nut for securing the stop body to the surface with one of its sides bearing against the workpiece and the stop-body axis fixed relative to the respective slot.

* * * * *